(12) United States Patent
Sakata et al.

(10) Patent No.: US 8,142,888 B2
(45) Date of Patent: Mar. 27, 2012

(54) INTEGRATED MOLDED PRODUCT OF A POLYBUTYLENE TEREPHTHALATE RESIN COMPOSITION HAVING SILICONE RUBBER EXCELLENTLY ADHERED THERETO WHICH CONCOMITANTLY DISPLAYS SUPERIOR HEAT SHOCK RESISTANCE

(75) Inventors: Kouichi Sakata, Shizuoka (JP); Hiroyuki Amano, Shizuoka (JP)

(73) Assignee: Wintech Polymer Ltd., Tokyo (JP)

( * ) Notice: Subject to any disclaimer, the term of this patent is extended or adjusted under 35 U.S.C. 154(b) by 0 days.

(21) Appl. No.: 12/746,953

(22) PCT Filed: Dec. 24, 2008

(86) PCT No.: PCT/JP2008/003908
§ 371 (c)(1),
(2), (4) Date: Jun. 9, 2010

(87) PCT Pub. No.: WO2009/081573
PCT Pub. Date: Jul. 2, 2009

(65) Prior Publication Data
US 2010/0267891 A1    Oct. 21, 2010

(30) Foreign Application Priority Data
Dec. 26, 2007 (JP) ................... 2007-334705

(51) Int. Cl.
*B32B 5/16* (2006.01)
*C08K 9/00* (2006.01)
(52) U.S. Cl. ......... 428/325; 428/327; 428/447; 523/201
(58) Field of Classification Search ................. 428/325, 428/447, 327; 523/201
See application file for complete search history.

(56) References Cited

U.S. PATENT DOCUMENTS 4,446,276 A    5/1984   Binsack et al.
5,491,869 A *  2/1996   Sullivan et al. ................. 15/245

FOREIGN PATENT DOCUMENTS

| JP | 57-182349 A | 11/1982 |
| JP | 63-3055 B2 | 1/1988 |
| JP | 3-285945 A | 12/1991 |
| JP | 9-165503 A | 6/1997 |
| JP | 10-316844 A | 12/1998 |
| JP | 2000-265046 A | 9/2000 |
| JP | 2000-336258 A | 12/2000 |
| JP | 2003-246919 A | 9/2003 |
| JP | 2005-42057 A | 2/2005 |
| JP | 2007077205 A * | 3/2007 |
| JP | 2007-91842 A | 4/2007 |
| WO | WO 2008/032636 A1 | 3/2008 |

OTHER PUBLICATIONS

Machine translation of JP 2007-077205 A, Mar. 29, 2007.*
International Search Report (PCT/ISA/210) dated Apr. 7, 2009.

* cited by examiner

*Primary Examiner* — Vickey Nerangis
(74) *Attorney, Agent, or Firm* — Buchanan Ingersoll & Rooney PC

(57) ABSTRACT

The present invention provides a polybutylene terephthalate resin composition which satisfies both performances such as high durability in an environment of heating and cooling cycle, and adhesion property to silicone rubber. Specifically, provided is a polybutylene terephthalate resin composition, exhibiting an excellent adhesion property to silicone rubber, containing: (A) 100 parts by weight of polybutylene terephthalate resin; (B) 5 to 30 parts by weight of a core-shell type polymer having a mean particle diameter of 2 μm or larger, in which a core layer is structured by an acrylic-based rubber, and (C) 20 to 100 parts by weight of glass fiber.

12 Claims, No Drawings

INTEGRATED MOLDED PRODUCT OF A POLYBUTYLENE TEREPHTHALATE RESIN COMPOSITION HAVING SILICONE RUBBER EXCELLENTLY ADHERED THERETO WHICH CONCOMITANTLY DISPLAYS SUPERIOR HEAT SHOCK RESISTANCE

TECHNICAL FIELD

The present invention relates to a polybutylene terephthalate resin composition, having an excellent adhesion property to silicone rubber, having no decreased adhesion to an epoxy resin adhesive, and being useful for automobile parts, electric/electronic parts or the like, and an integrated molded product of the polybutylene terephthalate resin composition with silicone rubber.

BACKGROUND ART

Polybutylene terephthalate resin is used in a wide range of fields as an engineering plastic, such as automobile parts, electric/electronic parts due to the excellent mechanical properties, electric properties, and other physical and chemical properties, along with good workability. In particular, in order to protect the contents from damages caused by moisture, dust, external shock, and the like, polybutylene terephthalate resin is preferably used for the casing containing base mounted with electronics parts thereon, and the insert-molded products on which sensor probe, connector terminal, and the like are mounted, and the like.

In these applications, for the purpose of avoiding as much as possible, the influence of moisture, dust, and the like on the base and the sensor body, a potting material is often heat cured by being filled in a cover with a base stored therein or a cover and a casing are often bonded and sealed with an adhesive. Recently, various joining methods such as double shot molding, hot-plate welding, vibration welding, and laser welding have been put into practical use. As for the potting intended for protecting the base, epoxy resins and silicone rubber are widely used independent of the joining methods and in particular, silicone rubber is often used for components requiring heat resistance and cold resistance.

In the application where the above methods are used, there are normally arranged metal terminals such as connector, metallic bus bar constituting electric circuit, varieties of sensor parts, and the like by pressure-working or insert-molding. Specifically in applications for parts mounted on automobile, high durability is required in many cases in an environment of high temperature/high humidity and of heating and cooling cycles. Accordingly, there are commonly used polybutylene terephthalate materials characterized by elastomers and various additives.

In consideration of such demands, in JP-A 63-3055, a molded product is proposed which is formed of polybutylene terephthalate and specific acrylic-based rubber and which is obtained by insert-molding a metal or an inorganic solid.

Although any of the materials proposed in JP-A 63-3055 exhibits superior characteristics to a certain extent regarding the heating and cooling cycle properties of the insert-molded product, the adhesion properties to silicone rubber are not mentioned and any of them actually shows seriously poor performances, and a surface for adhesion is preferably worked by an etching process and the like for adhesion, thus an alternative welding technique having been strongly desired.

Regarding adhesion with silicone rubber, the adhesion properties may be inhibited due to, not only the influence of a physical surface state (roughness) of the adherend material, but also the influence of chemical composition, for example, bleeding of additives such as lubricants, and chemical reactions of the adhesive may be suppressed due to the additives, and thus conventionally the composition of the adherend material has been prone to be a factor that determines the adhesion strength.

In parts for holding electronic parts requiring heat resistance, for the purpose of protecting the electronic parts from moisture and chemical substances, it is essential to inject silicone rubber into a casing for sealing after holding the electronic parts, and depending on the selection of the material of casing and cover, there were cases where that kind of silicone rubber caused poor curing and poor adhesion at the interface, and thus was unable to exert sufficient function as the parts, in some cases.

Although various known welding methods are proposed as a method of joining a casing for holding such electronic parts, joining with silicone rubber is usually carried out to avoid damages on the electronic parts in spite of the occasional occurrence of a curing failure or an interfacial adhesion failure as described above not to be able to function sufficiently as parts.

Further, JP-A 9-165503 and JP-A 10-316844 propose a composition containing, a specified polybutylene terephthalate, a specified silicon compound, a phenol-based antioxidant and/or a thioether-based antioxidant in order to improve the adhesion strength to an addition-reaction type silicone.

That kind of composition, however, cannot satisfy the heating and cooling cycle resistance of the material required in the automobile industry. Generally it is known that the addition of a specific silicon compound in large amounts deteriorates the physical properties of silicone rubber, and the presence of sulfur-based compound and trivalent phosphorus compound deactivates the platinum compound in the curing catalyst to thereby inhibit the reaction. Therefore, compositions disclosed in JP-A9-165503 and JP-A10-316844 are not practically applicable.

Further, in JP-A 2007-91842, although a use of an acrylic-based elastomer having a glycidyl group is proposed as a technique to improve the adhesion properties to epoxy or addition-type silicone rubber, the viscosity of the polybutylene terephthalate resin composition rises, so that the flowability may decrease.

DISCLOSURE OF THE INVENTION

The present invention was derived responding to the above technological issues, and an object of the present invention is to provide a polybutylene terephthalate resin composition which achieves a balance between the performance such as high durability in an environment of heating and cooling cycle, and the adhesion properties to a silicone rubber.

The inventors of the present invention have conducted detail study to obtain a polybutylene terephthalate resin composition capable of achieving the above object, and have found that a composition containing mainly polybutylene terephthalate resin along with a specific acrylic-based elastomer and glass fiber provides extremely high adhesion properties to a silicone rubber and resistance to heat shock without significant lowering of mechanical properties, thus having perfected the present invention.

That is, the present invention provides a polybutylene terephthalate resin composition, having an excellent adhesion property to silicone rubber, containing: (A) 100 parts by weight of polybutylene terephthalate resin; (B) 5 to 30 parts by weight of a core-shell type polymer having a mean particle diameter of 2 μm or larger, in which a core layer is structured by an acrylic-based rubber; and (C) 20 to 100 parts by weight of glass fiber, and provides a molded product prepared by molding the resin composition, specifically an insert-molded product.

The present invention provides a polybutylene terephthalate resin composition which achieves a balance between the performance such as high durability in an environment of heating and cooling cycle, and the adhesion properties to silicone rubber. The polybutylene terephthalate resin composition of the present invention is effectively used for the molded products of casing, cover, and housing, containing varieties of electric/electronic parts, specifically the electronic parts, and the molded products formed by insert-molding·pressure-working the metal terminals, metallic bus bar, or sensor. Furthermore, the molded product of polybutylene terephthalate resin composition of the present invention is particularly useful as a molded product of casing, cover, and housing containing electronic parts, potted and/or adhered by silicone rubber.

DETAIL DESCRIPTION OF THE INVENTION

The structural components of the resin material according to the present invention will be described below in detail. The (A) polybutylene terephthalate resin as the basic resin of the resin composition of the present invention is polybutylene terephthalate-based resin obtained by the polycondensation of a dicarboxylic acid component containing at least terephthalic acid or an ester-forming derivative thereof (such as lower alcohol) with a glycol component containing at least a $C_4$ alkylene glycol (1,4-butane diol) or an ester-forming derivative thereof. The polybutylene terephthalate resin is not limited to homo-butylene terephthalate resin, and may be a copolymer containing 60% by mole or more, (specifically about 75 to about 95% by mole), of butylene terephthalate unit.

In the polybutylene terephthalate resin, the dicarboxylic acid component (comonomer component) other than terephthalic acid and an ester-forming derivative thereof includes, for example, aromatic dicarboxylic acid components (like $C_6$-$C_{12}$ aryl dicarboxylic acids such as isophthalic acid, phthalic acid, naphthalenedicarboxylic acid or diphenyl ether dicarboxylic acid), aliphatic dicarboxylic acid components (like $C_4$-$C_{16}$ alkyl dicarboxylic acids such as succinic acid, adipic acid, azelaic acid or sebacic acid, and $C_5$-$C_{10}$ cycloalkyl dicarboxylic acids such as cyclohexanedicarboxylic acid, and the like), or an ester-forming derivative thereof. The dicarboxylic acid component can be used alone or in combination of two or more thereof.

Preferred dicarboxylic acid components (comonomer components) include aromatic dicarboxylic acid components (specifically $C_6$-$C_{10}$ aryl dicarboxylic acids such as isophthalic acid), aliphatic dicarboxylic acid components (specifically $C_6$-$C_{12}$ alkyl dicarboxylic acids such as adipic acid, azelaic acid or sebacic acid).

Examples of a glycol component (comonomer component) other than 1,4-butane diol are: aliphatic diol component (for example, alkylene glycol (such as $C_2$-$C_{10}$ alkylene glycol such as ethylene glycol, propylene glycol, trimethylene glycol, 1,3-butylene glycol, hexamethylene glycol, neopentyl glycol or 1,3-octane diol), polyoxy $C_2$-$C_4$ alkylene glycol (such as diethylene glycol, triethylene glycol or dipropylene glycol) or alicyclic diol such as cyclohexane dimethanol or hydrogenated bisphenol A); aromatic diol component (such as aromatic alcohol such as bisphenol A or 4,4'-dihydroxybiphenyl, or $C_2$-$C_4$ alkylene oxide adduct of bisphenol A (such as ethylene oxide 2-mole adduct of bisphenol A or propylene oxide 3-mole adduct of bisphenol A)), or an ester-forming derivative thereof. The glycol component can also be used alone or in combination of two or more thereof.

Preferred glycol component (comonomer component) includes aliphatic diol component, specifically $C_2$-$C_6$ alkylene glycol, polyoxy $C_2$-$C_3$ alkylene glycol such as diethylene glycol, and alicyclic diol such as cyclohexanedimethanol.

Any of the polybutylene terephthalate-based polymers generated by the polycondensation of the above compound as the monomer component can be used as the (A) component of the present invention. The combined use of homo-polybutylene terephthalate polymer and polybutylene terephthalate copolymer is also useful.

In the present invention, the (A) polybutylene terephthalate resin preferably has an intrinsic viscosity of 0.65 to 1.0, and preferably contains the terminal carboxyl group of 10 to 40 m-equivalent/kg. If the intrinsic viscosity is lower than the above range, desired mechanical properties cannot be attained. If the intrinsic viscosity exceeds the above range, the flowability of the composition significantly lowers to thereby deteriorate the injection-molding performance. If the content of the terminal carboxylic group is lower than the above range, the reinforcing effect of glass fiber significantly decreases and thus, the desired mechanical properties cannot be obtained. If the content thereof exceeds the above range, the desired heat shock resistance cannot be attained, which is not favorable.

Next, a core-shell type polymer to be used as the (B) component in the present invention will be described.

The core-shell type polymer (core-shell type elastomer) is a polymer having a multilayer structure that is structured by a core layer (core portion) and a shell layer covering the core layer (surface of the core layer) partially or entirely. In such a core-shell type polymer, either one of the core layer or the shell layer is configured with a rubber component (soft component) and the other component is configured with a hard component.

The usual core layer is often configured with a rubber component, and particularly in the present invention, acrylic-based rubber is used. The rubber component may have a glass transition temperature of, for example, less than 0° C. (for example, −10° C. or less), preferably −20° C. or less (for example, about −180° C. to −25° C.), even more preferably −30° C. or less (for example, about −150° C. to −40° C.).

The acrylic-based rubber as the rubber component is a polymer having, as a main component, an acrylic-based monomer (in particular, acrylic esters such as alkyl acrylates (acrylic acid $C_1$-$C_{12}$ alkyl esters like butyl acrylate, preferably acrylic acid $C_1$-$C_8$ alkyl ester, and more preferably acrylic acid $C_2$-$C_6$ alkyl ester)). The acrylic-based rubber may also be a single acrylic-based monomer or a copolymer thereof (copolymer of acrylic-based monomers, copolymer of an acrylic-based monomer and another monomer having an unsaturated bond, or the like) and may also be a copolymer of an acrylic-based monomer (and another monomer having an unsaturated bond) and a crosslinking monomer.

Examples of the crosslinking monomer may include (meth)acrylic-based monomers (polyfunctional(meth)acrylates (for example, alkylene(meth)acrylates, such as butylene di(meth)acrylate; vinyl-based monomers (for example, vinyl (meth)acrylate, divinyl benzene, and the like) of (poly)hydroxyalkane poly(meth)acrylates such as ethylene glycol di(meth)acrylate, butylene glycol di(meth)acrylate, poly(or oligo)ethylene glycol di(meth)acrylates (such as diethylene glycol di(meth)acrylate or triethylene glycol di(meth)acrylate), glycerin tri(meth)acrylate, trimethylolethane tri(meth)

acrylate, trimethylolpropane di(meth)acrylate, trimethylolpropane tri(meth)acrylate, pentaerythritol di(meth)acrylate, pentaerythritol tetra(meth)acrylate, dipentaerythritol tetra (meth)acrylate, dipentaerythritol hexa(meth)acrylate); glycidyl(meth)acrylate; and the like), hydrolyzed and condensed compounds having a polymerizable unsaturated bond (for example, silane coupling agents having a (meth)acryloyl group ((meth)acryloyloxyalkyl trialkoxysilanes such as 3-trimethoxypropyl(meth)acrylate) and the like), allylic compounds (for example, allyl(meth)acrylate, diallyl malate, diallyl fumarate, diallyl itaconate, monoallyl malate, monoallyl fumarate, triallyl(iso)cyanurate, and the like), and the like. These crosslinking monomers may also be used alone or in combination of two or more types.

In the acrylic-based rubber, the ratio of acrylic ester (in particular, alkyl acrylate) may be 50 to 100 weight % to the entire acrylic-based rubber, preferably 70 to 99 weight %, even more preferably 80 to 98 weight % approximately. Moreover, in the acrylic-based rubber, the ratio of the crosslinking monomer may be 0.1 to 10 parts by weight to 100 parts by weight of acrylic ester, preferably 0.2 to 5 parts by weight, even more preferably about 0.3 to 5 parts by weight.

In addition, the core layer may also contain a nonrubber component (for example, hard resin components described later) as long as it has acrylic-based rubber as a main component. The ratio of the rubber component to the entire core layer may be 30 to 100 weight %, preferably 50 to 100 weight %, even more preferably about 70 to 100 weight %. Furthermore, the structure of the core layer may be a uniform structure or may also be a nonuniform structure (salami structure, or the like).

In the core-shell type polymer, the shell layer is usually configured with a hard resin component (or a glassy resin component). The glass transition temperature of the hard resin component can be selected from a range of, for example, 0° C. or more (20° C. or more, for example), and may also be, for example, 30° C. or more (about 30° C. to 300° C., for example), preferably 50° C. or more (about 60° C. to 250° C., for example), even more preferably 70° C. or more (about 80° C. to 200° C., for example).

Such a hard resin composition is usually composed of a vinyl polymer (polymer of a vinyl monomer). In the vinyl polymer (resin), the vinyl monomer (vinyl-based monomer) is not particularly limited as long as the vinyl polymer can be is adjusted to the glass transition temperatures mentioned above, and the examples of the vinyl-based monomer include methacrylic-based monomers (for example, methacrylic esters such as alkyl methacrylates (for example, $C_1$-$C_{20}$ alkyl methacrylates such as methyl methacrylate, ethyl methacrylate, propyl methacrylate, butyl methacrylate, hexyl methacrylate or and 2-ethylhexyl methacrylate, preferably $C_1$-$C_{10}$ alkyl methacrylates, more preferably $C_1$-$C_6$ alkyl methacrylates), aryl methacrylates (phenyl methacrylate and the like), cycloalkyl methacrylates (cyclohexyl methacrylate and the like) and the like) as well as the monomers exemplified above (for example, acrylic-based monomers, aromatic vinyl-based monomers (for example, styrene and the like), olefin-based monomers, vinyl cyanide-based monomers (for example, (meth)acrylonitrile and the like)) and the like. The vinyl-based monomer may also be used alone or in combination of two or more types. The vinyl-based monomer may be often a polymer having at least one selected from methacrylic-based monomers, aromatic vinyl-based monomers and vinyl cyanide-based monomers, preferably at least a methacrylic ester (an alkyl methacrylate such as methyl methacrylate or the like), as a polymerization component.

The shell layer may be a single layer and may also be formed of a plurality of layers as long as it covers the core layer partially or entirely.

In the core-shell type polymer, the ratio of the core layer and the shell layer may be former/latter (ratio by weight)= 99/1 to 1/99, preferably 95/5 to 5/95, even more preferably 90/10 to 10/90, and may also be 95/5 to 30/70 (for example, 85/15 to 50/50) usually.

In the present invention, the amount of the (B) core-shell type polymer blended therein is 5 to 30 parts by weight to 100 parts by weight of the (A) polybutylene terephthalate resin. When the amount is less than the range, the improvement effect of the heat shock resistance is poor. Moreover, when the amount exceeds the range, the flowability decreases.

In the present invention, the (B) core-shell type polymer desirably has a mean particle diameter of 2 μm or more, preferably about 5 μm. The core-shell type polymer has lower adhesion strength to silicone rubber than that of polybutylene terephthalate, and when the mean particle diameter is smaller than 2 μm, the surface area of the core-shell type polymer becomes larger, and as a result, the adhesion properties to silicone rubber are assumed to decrease.

The shell layer of the core-shell type polymer is a portion where the shell layer comes into contact with a matrix resin and forms the interface with the matrix resin. The region where the shell layer forms the interface with the matrix resin desirably does not have a functional group reacting to the matrix resin, including a glycidyl group. By having a reactive functional group, the viscosity of the entire resin rises and the flowability at the time of the melting decreases, which may affect the moldability.

Any of known glass fibers is favorably used for the (C) glass fiber of the present invention. The glass fiber diameter, and shapes such as cylindrical shape, cocoon shape cross section, and oblong cross section, or the glass fiber length and cutting method in manufacturing chopped strand, roving, and the like of the glass fiber are arbitrary. Although the present invention does not limit the kind of the glass, E-glass and a corrosion-resistant glass containing zirconium element in the composition thereof are preferably used in view of quality.

In addition, in the present invention, for the purpose of improving the properties of the interface between the glass fiber and the resin matrix, there are preferably used glass fiber surface-treated by an organic treating agent such as aminosilane compound and epoxy compound. Specifically preferred one is glass fiber containing an organic treating agent by 1% by weight or more indicated by loss on heating. Preferable amino-silane compound and epoxy compound used in the glass fiber are any of known ones, independent of the kind of amino-silane compound and epoxy compound used for the surface treatment of the glass fiber according to the present invention.

The amount to be used of the (C) glass fiber is 20 to 100 parts by weight to 100 parts by weight of the (A) polybutylene terephthalate resin. If the content of the (C) glass fiber is less than the above range, the variations in linear expansion accompanied with the heating and cooling cycle become larger, which is unfavorable in terms of heat shock resistance. If the content of the (C) glass fiber exceeds the above range, the allowable strain of the material becomes smaller, which is unfavorable in terms of heat shock resistance. Preferable range of the content of (C) glass fiber is from 20 to 80 parts by weight, and more preferably from 30 to 60 parts by weight.

In order to further impart desired properties depending on the objects, the composition of the present invention may also be blended with, to the extent of not deteriorating the adhesion properties to silicone rubber, which is the original object of the present invention, known substances generally added to thermoplastic resin, thermosetting resin, and the like, including: stabilizer such as antioxidant, heat stabilizer, or UV absorber; antistatic agent; coloring agent such as dye or pigment; lubricator; plasticizer and crystallization promoter; crystal nucleation agent; hydrolysis-resistance enhancer (such as epoxy compound or carbodiimide); inorganic filler such as talc or glass flake, and the like.

The silicone rubber as referred to in the present invention is a liquid silicone rubber to be used as an adhesive and for potting electric/electronic parts, and is the one which is cured at room temperature or by heating. The silicone rubber is generally classified into roughly two types of addition-reaction type silicone rubber and condensation-reaction type silicone rubber. The addition-reaction type silicone rubber proceeds with curing due to an addition reaction by a platinum catalyst, and the condensation-reaction type silicone rubber proceeds with curing due to a condensation reaction, while generating acetone, alcohol, water, and other condensation products.

Further, in order to impart a low warping property to a molded product, resin components, such as polyethylene terephthalate, polycarbonate, styrene-acrylonitrile copolymers or styrene-butadiene-acrylonitrile copolymers, may also be added to the extent of not affecting the adhesion property to silicone rubber.

The resin composition of the present invention has excellent adhesion properties to silicone rubber, and further does not decrease epoxy adhesion properties.

The resin composition used in the present invention can be easily prepared by an apparatus and a method commonly used as the conventional method for preparing resin composition. For example, any of the following methods can be used: (1) a method in which the components are blended together, and the mixture is kneaded and extruded through a single-screw or twin-screw extruder to form pellets, and then the pellets are molded; (2) a method in which pellets having different compositions are prepared, and a specified amount of the pellets is blended to be subjected to molding, then after the molding, a molded product having the desired composition is obtained; (3) a method in which one or more of the respective components are directly supplied to a molding machine, and the like. A method in which a part of the resin components is finely powdered, which is then blended with other components is preferable in performing uniform blending of the components.

EXAMPLES

The present invention will be described below in more detail referring to Examples. The present invention, however, is not limited to these Examples.

Examples 1 to 2, Comparative Examples 1 to 4

As shown in Table 1, each components was dry-blended to 100 parts by weight of the (A) polybutylene terephthalate resin at the blending ratios shown in Table 1, which was melt-kneaded in a 30 mm dia. twin-screw extruder (TEX-30, manufactured by Japan Steel Works, Ltd.) to prepare pellets at a cylinder temperature of 260° C., extrusion rate of 15 kg/hr, and screw rotating speed of 150 rpm. Subsequently, each test piece was prepared from the pellets to determine a variety of physical properties. The result is also given in Table 1.

The detail of the components used and the method of determining the physical properties are as follows.
(A) Polybutylene terephthalate resin
  (A-1) Intrinsic viscosity of 0.69, manufactured by Win-Tech polymer, Ltd.
  (A-2) Modified polybutylene terephthalate prepared by the reaction between terephthalic acid and 1,4-butane diol, wherein 12.5% by mole of dimethyl isophthalate as the copolymer component is used instead of a part (12.5% by mole) of terephthalic acid; intrinsic viscosity of 0.74.
(B) Elastomer component
  (B-1) Acrylic-based core-shell polymer; EXL5136 produced by Rohm and Haas Co. (average dispersion diameter of 4 to 5 μm)
  (B'-1) Acrylic-based core-shell polymer; EXL2311 manufactured by Rohm and Haas Co. (average dispersion diameter of 0.3 to 0.6 μm)
  (B'-2) Glycidyl methacrylate modified acrylic-based elastomer; EXL2314 manufactured by Rohm and Haas Co. (average dispersion diameter of 0.1 to 0.3 μm)
  (B'-3) Acrylic-based core-shell polymer; KM336P manufactured by Rohm and Haas Co. (average dispersion diameter of 0.3 to 0.6 μm)
(C) Glass fiber
  (C-1) T127, manufactured by Nippon Electric Glass Co., Ltd.

[Adhesion Strength]

The center portion of the multipurpose test pieces prepared in accordance with ISO 3167 was cut into two pieces. A NITOFLON adhesive tape (thickness of 0.18 mm) with a 7×7 mm hole was adhered to one of the pieces, and a below shown adhesive was applied in the hole portion. Then, the other piece was stacked, followed by fixing them with a clip to join them together under a specified curing condition. After the joining, the pieces were allowed to stand in an environment of 23° C. and 50% RH for 24 hours or more. Then, a universal testing machine was used to carry out tearing and pressing of the joined pieces at a tearing and pressing speed of 5 mm/min, and determined the maximum value of tearing and pressing strength.

The types and curing conditions of the adhesives are as follows.

Addition-reaction type silicone rubber; SE1714 manufactured by Dow Corning Toray Silicone Company Ltd.
(Curing Condition; 120° C. for one hour)
Condensation-reaction type silicone rubber; TSE399 manufactured by Momentive Performance Materials Inc.
(Curing Condition; 23° C. for seven days)
Epoxy adhesive; XN1244B manufactured by Nagase ChemteX Corp.
(Curing Condition; 120° C. for 30 minutes)

[Melt Viscosity Properties]

The melt viscosity was determined in accordance with ISO 11443, at a cylinder temperature of 260° C.

[Average Dispersion Diameter of Core-Shell Type Polymer]

The center portion of the multipurpose test pieces prepared in accordance with ISO 3167 was cut in the center and the cut portions were immersed in xylene at 115° C. for 2.5 hours for an etching process. Then, three areas of a portion at the center along the width in the cut portions were observed with an electron microscope on the fracture surfaces, and by defining the diameter of a hole formed by separation of the core-shell type polymer at each observation point as a particle diameter (dispersion diameter), the dispersion diameter was measured in arbitrary ten pieces for obtaining average dispersion diameter.

[Heat Shock Resistance]

Insert-injection molding was carried out by injecting the pellets into a mold for forming test pieces (a mold for inserting an iron core of 18 mm in length, 18 mm in wide, and 30 mm in height into a square column of 22 mm in length, 22 mm in wide, and 51 mm in height) so as to provide 1 mm of minimum wall thickness of a portion of the molded resin part, at a resin temperature of 260° C., a mold temperature of 65° C., an injection time of 25 sec, and a cooling time of 10 sec, and thus the insert-molded product was obtained. With a heating and cooling shock testing machine, the insert-molded product was subjected to a heat-shock resistance test by the cycles of: heating to 140° C. and holding the temperature for one and a half hours; cooling to −40° C. and holding the temperature for one and a half hours; and heating to 140° C. The number of cycles when crack appeared on the molded product was determined to evaluate the heat shock resistance.

TABLE 1

|  | Example 1 | Example 2 | Comparative Example 1 | Comparative Example 2 | Comparative Example 3 | Comparative Example 4 |
| --- | --- | --- | --- | --- | --- | --- |
| A-1 (parts by weight) | 100 |  | 100 | 100 | 100 | 100 |
| A-2 (parts by weight) |  | 100 |  |  |  |  |
| B-1 (parts by weight) | 17 | 17 |  |  |  |  |
| B'-1 (parts by weight) |  |  | 17 |  |  |  |
| B'-2 (parts by weight) |  |  |  | 17 |  |  |
| B'-3 (parts by weight) |  |  |  |  | 17 |  |
| C-1 (parts by weight) | 50 | 50 | 50 | 50 | 50 | 40 |
| Adhesion strength to addition-reaction type silicone rubber (N) | 180 | 160 | 20 | 100 | 70 | 100 |
| Adhesion strength to condensation-reaction type silicone rubber (N) | 56 | 56 | 40 | 40 | 40 | 30 |
| Epoxy adhesive strength (N) | 520 | 450 | 440 | 500 | 400 | 350 |
| Heat shock resistance | 260 | 250 | 180 | 200 | 130 | 40 |
| Melt viscosity (kPa · sec) | 0.20 | 0.20 | 0.23 | 0.31 | 0.24 | 0.18 |

The invention claimed is:

1. An integrated molded product of a polybutylene terephthalate resin composition with silicone rubber excellently adhered thereto which concomitantly displays superior heat shock resistance, prepared by injecting and curing silicone rubber onto the surface of a molded product obtained by molding the polybutylene terephthalate resin composition comprising (A) 100 parts by weight of polybutylene terephthalate resin; (B) 5 to 30 parts by weight of a core-shell type polymer having an average dispersion diameter of 4 to 5 μm in which the core layer is an acrylic-based rubber, and (C) 20 to 100 parts by weight of glass fiber.

2. The integrated molded product according to claim 1, wherein the integrated molded product is a molded product of a casing, a cover, or a housing for holding an electronic component, prepared by insert-molding•pressure-working of a metal terminal, a metal bus bar or a sensor.

3. An integrated molded product according to claim 1, wherein said polybutylene terephthalate (A) has an intrinsic viscosity of 0.65 to 1.0.

4. An integrated molded product according to claim 1, wherein said core-shell polymer (B) has a mean particle diameter of about 5 μm.

5. An integrated molded product according to claim 1, wherein said glass fiber component (C) is present in said polybutylene terephthalate composition in a concentration of 20 to 80 parts by weight.

6. An integrated molded product according to claim 1, wherein said glass fiber component (C) is present in a concentration of 30 to 60 parts by weight.

7. An integrated molded product of a polybutylene terephthalate resin composition with silicone rubber excellently adhered thereto which concomitantly displays superior heat shock resistance, prepared by injecting and curing silicone rubber onto the surface of a molded product obtained by molding the polybutylene terephthalate resin composition comprising (A) 100 parts by weight of polybutylene terephthalate resin; (B) 5 to 30 parts by weight of a core-shell type polymer having an average dispersion diameter of 4 to 5 μm in which the core layer is an acrylic-based rubber and no glycidyl group is present in the shell layer, and (C) 20 to 100 parts by weight of glass fiber.

8. The integrated molded product according to claim 7, wherein the integrated molded product is a molded product of a casing, a cover, or a housing for holding an electronic component, prepared by insert-molding•pressure-working of a metal terminal, a metal bus bar or a sensor.

9. An integrated molded product according to claim 7, wherein said polybutylene terephthalate (A) has an intrinsic viscosity of 0.65 to 1.0.

10. An integrated molded product according to claim 7, wherein said core-shell polymer (B) has a mean particle diameter of about 5 μm.

11. An integrated molded product according to claim 7, wherein said glass fiber component (C) is present in said polybutylene terephthalate composition in a concentration of 20 to 80 parts by weight.

12. An integrated molded product according to claim 7, wherein said glass fiber component (C) is present in a concentration of 30 to 60 parts by weight.

* * * * *